United States Patent
Schuette et al.

(10) Patent No.: US 10,926,237 B2
(45) Date of Patent: Feb. 23, 2021

(54) SOLUBLE CORROSION RESISTANT SOL-GEL

(71) Applicant: THE BOEING COMPANY, Chicago, IL (US)

(72) Inventors: Waynie M. Schuette, Troy, IL (US); Patrick J. Kinlen, Fenton, MO (US)

(73) Assignee: THE BOEING COMPANY, Chicago, IL (US)

( * ) Notice: Subject to any disclaimer, the term of this patent is extended or adjusted under 35 U.S.C. 154(b) by 42 days.

(21) Appl. No.: 16/226,992

(22) Filed: Dec. 20, 2018

(65) Prior Publication Data
US 2019/0240635 A1   Aug. 8, 2019

Related U.S. Application Data

(60) Provisional application No. 62/625,792, filed on Feb. 2, 2018.

(51) Int. Cl.
| | | |
|---|---|---|
| *B01J 13/00* | (2006.01) | |
| *C08G 77/58* | (2006.01) | |
| *C09D 5/08* | (2006.01) | |
| *C09D 183/14* | (2006.01) | |
| *C09D 7/63* | (2018.01) | |
| *C09D 163/00* | (2006.01) | |
| *C09D 175/04* | (2006.01) | |
| *C23C 18/04* | (2006.01) | |
| *C23C 18/12* | (2006.01) | |
| *C08K 5/00* | (2006.01) | |

(52) U.S. Cl.
CPC .......... *B01J 13/0065* (2013.01); *C08G 77/58* (2013.01); *C09D 5/08* (2013.01); *C09D 5/084* (2013.01); *C09D 7/63* (2018.01); *C09D 163/00* (2013.01); *C09D 175/04* (2013.01); *C09D 183/14* (2013.01); *C23C 18/04* (2013.01); *C23C 18/1245* (2013.01); *C08K 5/005* (2013.01)

(58) Field of Classification Search
CPC ...... B01J 13/0065; C08G 77/58; C08K 5/005; C09D 5/08; C09D 5/084; C09D 7/63; C09D 163/00; C09D 175/04; C09D 183/14; C23C 18/04; C23C 18/1245
See application file for complete search history.

(56) References Cited

U.S. PATENT DOCUMENTS

| | | | | |
|---|---|---|---|---|
| 7,141,306 B1 * | 11/2006 | McKee | ............. | C09D 4/00 428/447 |
| 7,563,513 B2 * | 7/2009 | Krienke | ............. | B05D 3/102 106/287.11 |
| 7,579,049 B2 * | 8/2009 | Chung | ............. | C09D 5/084 427/409 |
| 7,713,347 B2 * | 5/2010 | Krienke | ............. | C08G 77/58 106/287.13 |
| 8,592,042 B2 * | 11/2013 | Blohowiak | ............. | C09D 183/00 428/447 |
| 8,715,405 B2 * | 5/2014 | Le Blanc | ............. | B32B 17/10 106/287.1 |
| 9,290,846 B2 | 3/2016 | Rey et al. | | |
| 2003/0024432 A1 | 2/2003 | Chung et al. | | |
| 2012/0085261 A1 * | 4/2012 | Barbe | ............. | C23F 11/185 106/14.42 |
| 2018/0208777 A1 * | 7/2018 | Schuette | ............. | B64D 45/00 |
| 2019/0002705 A1 * | 1/2019 | Moore | ............. | C09D 5/08 |
| 2019/0002739 A1 * | 1/2019 | Moore | ............. | C23C 18/122 |
| 2019/0002740 A1 * | 1/2019 | Moore | ............. | C09J 9/00 |

FOREIGN PATENT DOCUMENTS

WO   2005071021 A1   8/2005

OTHER PUBLICATIONS

PCT Notification of Transmittal of the International Search Report and The Written Opinion of the International Searching Authority, or the Declaration for Application No. PCT/US2019/016338 dated May 9, 2019.

Mei Yu et al: "Effects of cerium salts on corrosion behaviors of Si—Zr hybrid sol-gel coatings" Chinese Journal of Aeronautics, vol. 28, No. 2, Apr. 1, 2015.

Asgar Kayan: "Preparation, Characterization and Application of Inorganic-Organic Hybrid Polymers,Poly-GPTS/M (CL) x O(OH)" Industrial & Engineering Chemistry Research, vol. 51, No. 41, Oct. 17, 2012.

\* cited by examiner

*Primary Examiner* — Anthony J Green
(74) *Attorney, Agent, or Firm* — Patterson + Sheridan, LLP

(57) ABSTRACT

Aspects described herein generally relate to a sol-gel that is the reaction product of an organosilane, a metal alkoxide, an acid, and chromium (III) salt and/or a lanthanide salt having a solubility of about 1 gram or greater per gram of sol-gel at 23° C. The lanthanide salt includes a cation and a ligand. The cation can be lanthanum, cerium, praseodymium, neodymium, promethium, samarium, europium, gadolinium, terbium, dysprosium, holmium, erbium, thulium, ytterbium, lutetium, scandium, yttrium, cobalt, calcium, strontium, barium, and zirconium. A ligand can be a nitrate, a trifluoromethane sulfonate, a sulfate, a phosphate, a hydroxide, or hydrate forms thereof. The chromium (III) salt includes a cation and a ligand. The cation is chromium (III) and the ligand can be a nitrate, a trifluoromethane sulfonate, a sulfate, a phosphate, a hydroxide, or hydrate forms thereof.

36 Claims, 1 Drawing Sheet

SOLUBLE CORROSION RESISTANT SOL-GEL

CROSS REFERENCE TO RELATED APPLICATIONS

This patent application claims priority to and the benefit of U.S. Provisional Patent Application No. 62/625,792, filed Feb. 2, 2018, which is incorporated herein by reference in its entirety.

FIELD

Aspects of the present disclosure generally relate to corrosion resistant sol-gels and methods of forming sol-gels.

BACKGROUND

Aircraft surfaces are typically made of a metal, such as aluminum or titanium. A primer can be coated on the metal surface to prevent or reduce corrosion. Furthermore, an adhesive coating is typically disposed between a metal surface and a primer to promote adhesion between the metal and the primer.

An adhesive sol-gel film may be disposed at the interface between the metal and primer. After extended use of the aircraft surface, a sol-gel film may become increasingly porous. The pores retain water over time, which can promote corrosion of the metal surface. Typical sol-gel films do not inherently possess corrosion resistance properties. Furthermore, the presence of water within the pores is subject to an increase of osmotic pressure within the pore which creates a visually noticeable defect in the surface known as a "blister".

Corrosion protection of aircraft metal surfaces has typically relied on primers having hexavalent chromium. However, there is regulatory pressure to eliminate the use of hexavalent chromium from primers and pretreatments. Furthermore, corrosion inhibitors have been added to sol-gel films (or included in the formation of the sol-gel film). However, these inhibitors have been found to decrease both the adhesiveness of the sol-gel film and are poorly soluble in aqueous sol-gels, which reduces the anticorrosion ability of the corrosion inhibitor when present in the sol-gel. In addition, some conventional sol-gels have a high halogen content (e.g., fluorine or chlorine) which does not provide optimal adhesion with primers in addition to initiating pitting and etching of metal surfaces. Also, some sol-gel-based corrosion inhibitor coatings can protect metals that are less prone to corrosion (such as Al 7075), but may be insufficient for protection of harder to protect metals (such as Al 2024).

Therefore, there is a continuing need for new and improved corrosion resistant, adhesive sol-gels and methods of forming sol-gels.

SUMMARY

In one aspect, a sol-gel includes an organosilane, a metal alkoxide, an acid, a chromium (III) salt and/or a lanthanide salt having a solubility of about 1 gram or greater per gram of sol-gel at 23° C., and water.

In another aspect, a component, such as a vehicle component, includes a metal substrate and a sol-gel disposed on the metal substrate. The sol-gel includes an organosilane, a metal alkoxide, an acid, a chromium (III) salt and/or a lanthanide salt having a solubility of about 1 gram or greater per gram of sol-gel at 23° C., and water.

In another aspect, a method of forming a sol-gel includes mixing a metal alkoxide and an acid to form a first mixture; mixing an organosilane with the first mixture to form a second mixture; and mixing with the second mixture a chromium (III) salt and/or a lanthanide salt to form a third mixture.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
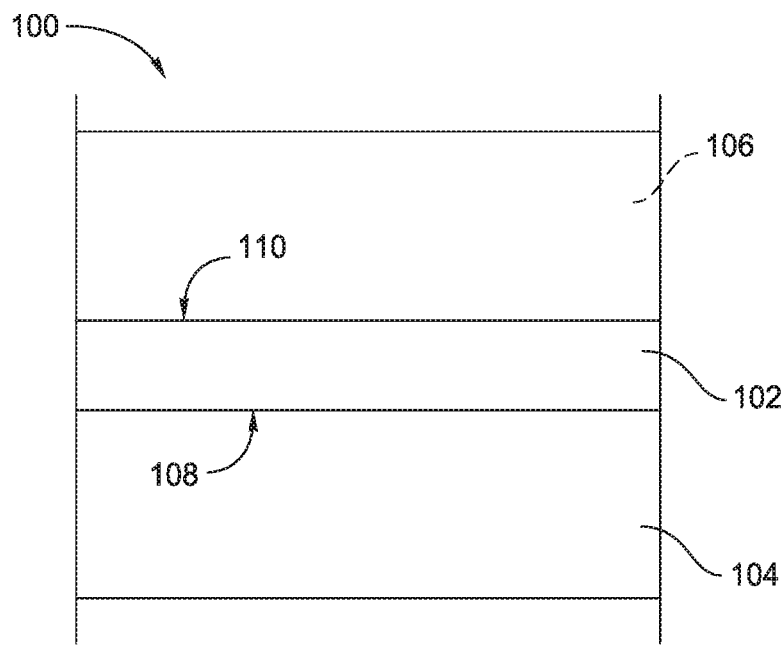
FIG. 1 is a side view of a corrosion-inhibiting sol-gel disposed on a substrate.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Aspects of the present disclosure generally relate to corrosion resistant sol-gels and methods of forming sol-gels. Sol-gels of the present disclosure include (or are the reaction product of) an organosilane, a metal alkoxide, an acid, and a chromium (Cr) (III) salt, such as chromium (III) sulfate, and/or a lanthanide salt. It has been discovered that chromium (III) salts or lanthanide salts, such as lanthanide (III) nitrates, are corrosion inhibitors having a high solubility in aqueous sol-gels. Because corrosion inhibitors of the present disclosure are, unlike conventional corrosion inhibitors, readily soluble in the aqueous sol-gel, the corrosion inhibitors can diffuse through the sol-gel to protect the metal substrate from corrosion. Diffusion through the sol-gel can allow soluble inhibitors to leach out of the coating to some extent and protect a substrate from corrosion, unlike insoluble inhibitors. The high solubility provides improved inhibitor efficiency because of the reduced solids content in the sol-gel and a more uniform coating with lower porosity, as compared to sol-gels having corrosion inhibitors of low solubility in the sol-gel. Soluble corrosion inhibitors of the present disclosure also provide lower concentrations of corrosion inhibitor in a sol-gel while maintaining or improving the corrosion resistance of the sol-gel, as compared to sol-gels having corrosion inhibitors of low solubility in the sol-gel. Soluble corrosion inhibitors also provide sol-gel coatings with more uniformity and lower porosity as compared to sol-gel coatings having corrosion inhibitors of low solubility. Furthermore, sol-gels having soluble corrosion inhibitors can maintain their adhesion properties when disposed on a metal substrate and/or when a primer layer is disposed on the sol-gel due to the reduced solids content of the sol-gel, as compared to a sol-gel without soluble corrosion inhibitor and due to the low halogen content, as compared to conventional halogen-rich sol-gels.

It has also been discovered that soluble corrosion inhibitors of the present disclosure do not hinder (1) sol-gel formation, (2) adhesive ability of the sol-gel film upon addition of the corrosion inhibitor, or (3) anticorrosion ability of the corrosion inhibitor. Sol-gels of the present disclosure have inherent corrosion inhibiting ability, and, primers (disposed on the sol-gel) having hexavalent (VI) chromium are merely optional.

Methods of forming a sol-gel of the present disclosure include mixing a metal alkoxide and an acid, such as acetic acid, followed by stirring for about 1 minute to about 1 hour, such as about 30 minutes. An organosilane is then added to the mixture and stirred from about 1 minute to about 1 hour, such as about 30 minutes. A corrosion inhibitor is added to the mixture. The mixture can be deposited onto a metal substrate. The deposited mixture may be cured at ambient temperature or can be heated to increase the rate of curing/sol-gel formation.

Sol-Gels

The term "sol-gel," a contraction of solution-gelation, refers to a series of reactions wherein soluble metal species (typically a metal alkoxide or metal salt) hydrolyze to form a metal hydroxide. A soluble metal species forms heterometal bonds e.g. Si—O—Zr. An acid is added to the metal alkoxide to provide a water-based system, which can be due to protonation of oxygen atoms present in the sol-gel. Depending on reaction conditions, the metal polymers may condense to colloidal particles or they may grow to form a network gel.

Sol-gels of the present disclosure include (or are the reaction product of) one or more sol-gel components: an organosilane, a metal alkoxide, an acid, a chromium (III) salt and/or a lanthanide salt, and water.

Organosilane:

An organosilane of the present disclosure can be represented by Formula (I):

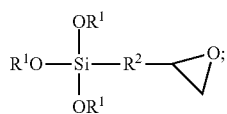

(I)

wherein each $R^1$ is independently selected from $C_1$-$C_{20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl;

$R^2$ is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

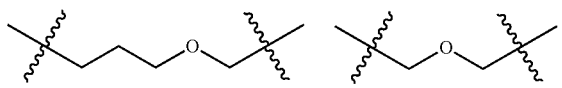

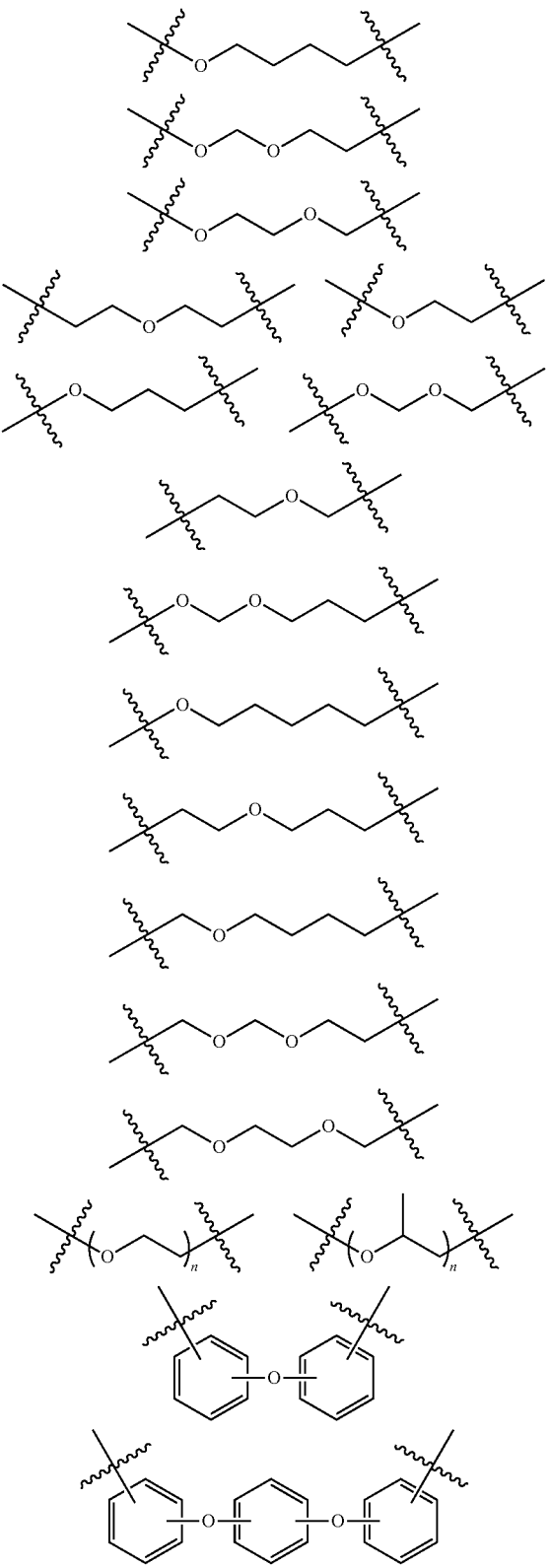

-continued n is a positive integer. In at least one aspect, n is a positive integer and the number average molecular weight (Mn) of the ether is from about 300 to about 500, such as from about 375 to about 450, such as from about 400 to about 425.

In at least one aspect, an organosilane is (3-glycidyloxypropyl)trimethoxysilane (GTMS), (3-glycidyloxypropyl)triethoxysilane, or (3-glycidyloxypropyl)tripropoxysilane.

An organosilane can be a hydroxy organosilane. A hydroxy organosilane prevents or reduces porosity and blistering of a sol-gel/primer coating on a metal surface, providing a corrosion inhibiting ability of a sol-gel film because accumulation of water within the sol-gel is prevented or reduced. Furthermore, a molar ratio of acid to metal alkoxide is about 1:1 or greater, such as about 2:1 or greater, which does not hinder (1) sol-gel formation, (2) adhesive ability of the sol-gel film upon addition of a corrosion inhibitor, or (3) anticorrosion ability of the corrosion inhibitor. Sol-gels of the present disclosure have inherent corrosion inhibiting ability, and, primers (disposed on the sol-gel) having hexavalent (VI) chromium are merely optional.

A hydroxy organosilane of sol-gels of the present disclosure provides reduced porosity and blistering of sol-gels. In at least one aspect, a hydroxy organosilane is represented by formula (II):

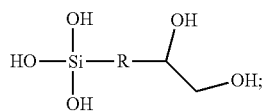
(II)

wherein R is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

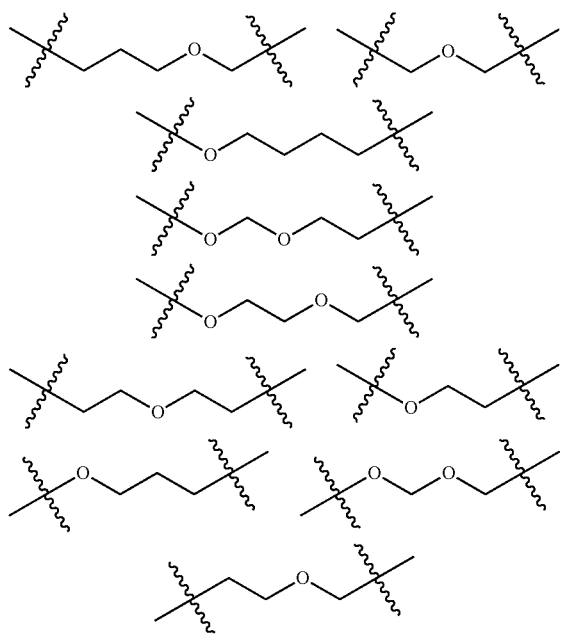

-continued

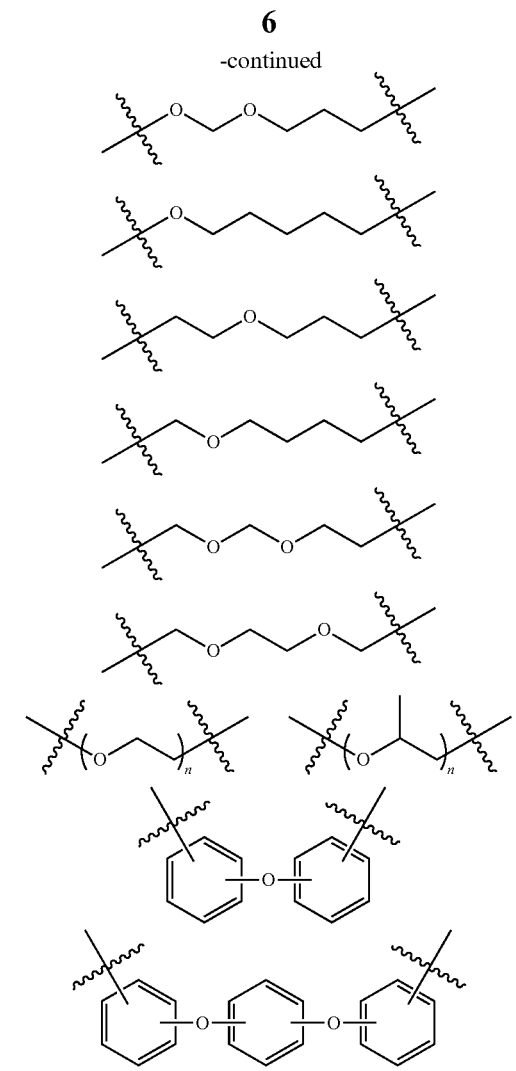

n is a positive integer. In at least one aspect, n is a positive integer and the number average molecular weight (Mn) of the ether is from about 300 to about 500, such as from about 375 to about 450, such as from about 400 to about 425.

In at least one aspect, the hydroxy organosilane is (3-(2,3-dihydroxypropoxy)propyl)silanetriol, which is represented by compound 1:

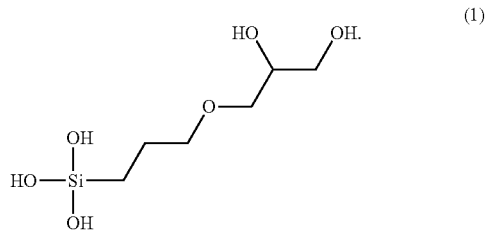 [SMILES: OCC(O)COCCC[Si](O)(O)O]
(1)

Metal Alkoxide:

Metal alkoxides of the present disclosure include zirconium alkoxides, titanium alkoxides, hafnium alkoxides, yttrium alkoxides, cerium alkoxides, lanthanum alkoxides, or mixtures thereof. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide. A metal alkoxide useful to form sol-gels of the present disclosure can provide metal atoms coordinated in a sol-gel for adhesive and mechanical strength.

Corrosion Inhibitor:

Corrosion inhibitors of the present disclosure are a chromium (III) salts and/or lanthanide salts. A corrosion inhibitor useful to form sol-gels of the present disclosure can provide corrosion resistance of a metal substrate disposed adjacent the sol-gel. Metal surfaces, such as aircraft surfaces, are typically alloys having a major component, such as aluminum (such as Al 2024 or Al7075), and a minor component, known as an intermetallic. Intermetallics often contain copper metal which is prone to corrosion. Without being bound by theory, it is believed that the interaction of soluble chromium (III) metals and/or lanthanide metals of the present disclosure, such as lanthanide (III) nitrates, with copper-containing intermetallics on a metal surface (such as an aluminum alloy surface) prevents corrosion of the metal surface. For example, interaction of the soluble lanthanide metals of a corrosion inhibitor of the present disclosure with the intermetallics blocks reduction of the intermetallics by slowing the rate of oxygen reduction and decreasing oxidation of a metal alloy, such as an aluminum alloy.

In at least one aspect, a lanthanide salt is a lanthanide (II) salt, lanthanide (III) salt, or lanthanide (IV) salt. Lanthanide salts have a cation and a ligand. The ligand can be neutrally charged or anionic. The number of ligands of the lanthanide salt corresponds to the oxidation state of the cation. For example, a lanthanide (II) salt can have two ligands, a lanthanide (III) salt can have three ligands, and a lanthanide (IV) salt can have four ligands. Lanthanide salts include a cation selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu). For purposes of the present disclosure, a lanthanide salt can be a cation selected from scandium (Sc), yttrium (Y), cobalt (Co), calcium (Ca), strontium (Sr), barium (Ba), and zirconium (Zr). In at least one aspect, a lanthanide is lanthanum (La), cerium (Ce), praseodymium (Pr), or yttrium (Y). In at least one aspect, a lanthanide salt has one or more ligands selected from nitrates, trifluoromethane sulfonates, sulfates, phosphates, hydroxides, and hydrate forms thereof. In at least one embodiment, a lanthanide salt has one or more ligands that are sulfate and a cation is selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc), yttrium (Y), cobalt (Co), strontium (Sr), and zirconium (Zr).

In at least one aspect, a chromium (III) salt has a cation and a ligand. The ligand can be neutrally charged or anionic. The number of ligands of the chromium (III) salt corresponds to the oxidation state of the cation. For example, a chromium (III) salt has three ligands. Chromium salts include a cation that is chromium (Cr) (such as Cr(III)). In at least one aspect, a chromium salt has one or more ligands selected from nitrates, trifluoromethane sulfonates, sulfates, phosphates, hydroxides, and hydrate forms thereof. In at least one embodiment, a chromium salt has one or more ligands that are sulfate. It has been discovered that chromium (III) salts are soluble in aqueous sol-gels and provide corrosion inhibition in addition to having reduced regulatory pressure as compared to (hexavalent) chromium (VI)-based inhibitors. Indeed, chromium (III) salts are present in vitamins and food.

In at least one aspect, a weight fraction (wt %) of (metal alkoxide+organosilane+acid) in the sol-gel is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 3 wt %, about 10 wt %, about 12 wt %, about 15 wt %. A greater amount of (metal alkoxide+organosilane+acid) can provide greater amounts of corrosion inhibitor to be present in the sol-gel. A weight fraction (wt %) of corrosion inhibitor in the sol-gel is from about 0.1 wt % to about 500 wt %, such as from about 0.2 wt % to about 50 wt %, such as from about 0.5 wt % to about 35 wt %, such as from about 1 wt % to about 30 wt %, such as from about 2 wt % to about 25 wt %, such as from about 3 wt % to about 10 wt %, for example about 4 wt %, about 5 wt %, about 7 wt %, about 10 wt, about 15 wt %. Because of the improved solubility of corrosion inhibitors of the present disclosure, a greater ratio of corrosion inhibitor to binder (i.e., metal alkoxide+organosilane+acid) can be used as compared to corrosion inhibitors having a lower solubility in a sol-gel. In addition, because of the improved solubility of corrosion inhibitors of the present disclosure in sol-gels, a smaller ratio of corrosion inhibitor to binder (i.e., metal alkoxide+organosilane+acid) can be used as compared to corrosion inhibitors having a lower solubility in a sol-gel. In at least one aspect, a ratio of corrosion inhibitor to binder is from about 1:1 to about 5:1 by weight, such as from about 2:1 to about 4:1 by weight, such as from about 2:1 to about 3:1 by weight. Alternatively, a ratio of corrosion inhibitor to binder is from about 0.01:1 to about 0.5:1 by weight, such as from about 0.05:1 to about 0.4:1 by weight, such as from about 0.1:1 to about 0.3:1 by weight, such as from about 0.01:1 to about 0.05:1 by weight.

In embodiments where a sol-gel of the present disclosure is used as a coating on a component of an aircraft, less than 50 wt % of the salt in the sol-gel is preferred to ensure that the concentration is not greater than the critical pigment volume concentration (CPVC) of the inhibitor in the coating. Exceeding the CPVC of the coating can hinder some coating properties, such as porosity.

The solubility of corrosion inhibitors of the present disclosure provides a reduced solids content of a sol-gel, as compared to a sol-gel having conventional corrosion inhibitors of low solubility. In at least one aspect, a sol-gel of the present disclosure has a solids content of about 1 wt % or less, such as about 0.5 wt % or less, such as about 0.1 wt % or less, based on the total weight of the sol-gel, as determined by gravimetric analysis. Gravimetric analysis includes drying (to dryness) a sol-gel formulation with 1-10 wt % soluble inhibitors in an oven and recording mass weight before and after drying. In addition, a reduced halogen content of a sol-gel of the present disclosure, as compared to a conventional sol-gel, provides improved adhesion of the sol-gel to an adjacent primer layer. In at least one aspect, a sol-gel of the present disclosure has a halogen content of about 1 wt % or less, such as about 0.5 wt % or less, such as 0.1 wt % or less, based on the total weight of the sol-gel, as determined by gravimetric analysis.

In at least one aspect, a corrosion inhibitor of the present disclosure has a solubility of about 1 gram (g) or greater per gram of sol-gel, such as about 2 g or greater per gram of sol-gel at 23° C., such as about 3 g or greater per gram of sol-gel, such as about 4 g or greater per gram of sol-gel.

It has been discovered that corrosion inhibitors of the present disclosure are, unlike conventional corrosion inhibitors, readily soluble in the aqueous sol-gel and, as such, can diffuse through the sol-gel to protect the metal substrate from corrosion. The soluble corrosion inhibitors of the present disclosure provide greater inhibitor efficiency as compared to insoluble corrosion inhibitors and provide lower concentrations of corrosion inhibitor in a sol-gel, as compared to insoluble corrosion inhibitors in a sol-gel. Soluble corrosion inhibitors also provide sol-gel coatings with more uniformity and lower porosity as compared to sol-gel coatings having insoluble corrosion inhibitors.

Acid:

An acid (e.g., acid stabilizer) used to form sol-gels of the present disclosure provides stabilization of a metal alkoxide and a corrosion inhibitor of the sol-gel as well as pH reduction of the sol-gel. The pH value of a sol-gel (and composition that forms the sol-gel) can be controlled by use of an acid. Acid stabilizers of the present disclosure include organic acids. Organic acids include acetic acid (such as glacial acetic acid) or citric acid. Less acidic acid stabilizers may also be used, such as glycols, ethoxyethanol, or $H_2NCH_2CH_2OH$.

In at least one aspect, a molar ratio of acid to metal alkoxide is from about 1:1 to about 40:1, such as from about 3:1 to about 8:1, such as from about 4:1 to about 6:1, such as from about 4:1 to about 5:1. In at least one aspect, a pH of a sol-gel of the present disclosure is from about 3 to about 4.

Without being bound by theory, it is believed that acid in these ratios not only contributes to stabilizing a metal alkoxide for hydrolysis, but can also protonate a corrosion inhibitor, which promotes solubility of the corrosion inhibitor in the sol-gel. Solubility of a corrosion inhibitor of the present disclosure is further promoted by use of a hydroxy organosilane in the sol-gel because hydroxy moieties of a hydroxy organosilane can chelate to cationic moieties of a corrosion inhibitor. Due to the improved solubility of corrosion inhibitors in a sol-gel (and reduced solids content of a sol-gel), a corrosion inhibitor of the present disclosure can move through the sol-gel and perform corrosion inhibition at, for example, a metal substrate surface.

Sol-gel components of the present disclosure, such as corrosion inhibitors, may be dissolved in one or more solvents before being added to a mixture containing other sol-gel components. Conventional corrosion inhibitors, for example, generally have limited solubility and are typically suspended in water and aqueous solvents, emulsified, and/or dispersed within incompatible solutions and/or solvents. Corrosion inhibitors of the present disclosure can be dissolved in water or an aqueous solution. In at least one aspect, a sol-gel of the present disclosure comprises about 50 wt % or greater of water, such as about 60 wt % or greater, such as about 70 wt % or greater, such as about 80 wt % or greater, such as about 90 wt % or greater, such as about 95 wt % or greater, based on the total weight of the sol-gel.

Additionally or alternatively, a corrosion inhibitor can be dissolved, suspended, emulsified, and/or dispersed in an organic solvent such as an alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), or mixtures thereof. Upon curing, e.g. heating, of a mixture containing the sol-gel components, some or all of the solvent(s) can be removed from the sol-gel/mixture.

Sol-Del Systems

FIG. 1 is a side view of a corrosion-inhibiting sol-gel disposed on a substrate. As shown in FIG. 1, a corrosion-inhibiting sol-gel system 100 comprises a sol-gel 102 disposed on a substrate 104. Substrate 104 can be a metal substrate. Sol-gel 102 has corrosion inhibiting properties which can provide corrosion protection of substrate 104 if, for example, substrate 104 is a metal substrate. Sol-gel 102 promotes adherence between substrate 104 and a secondary layer 106. Secondary layer 106 can be a sealant or paint.

Substrate 104 can be any suitable material and/or can include any suitable structure that can benefit from sol-gel 102 being disposed thereon. Substrate 104 may define one or more components (such as structural or mechanical components) of environmentally exposed apparatuses, such as aircraft, watercraft, spacecraft, land vehicles, equipment, wind turbines, and/or another suitable apparatus. Substrate 104 can be part of a larger structure, such as a component, such as a vehicle component. A vehicle component is any suitable component of a vehicle, such as a structural component, such as a panel or joint, of an aircraft, automobile, etc. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. Substrate 104 can be a metal substrate made of aluminum, aluminum alloy, nickel, iron, iron alloy, steel, titanium, titanium alloy, copper, copper alloy, or mixtures thereof. Substrate 104 can be a 'bare' substrate, having no plating (e.g., unplated metal), conversion coating, and/or corrosion protection between substrate 104 and sol-gel 102. Additionally or alternatively, substrate 104 can include surface oxidization. Hence, sol-gel 102 can be directly bonded to substrate 104 and/or to a surface oxide layer on a surface of substrate 104.

Secondary layer 106 is disposed on a second surface 110 of sol-gel 102 opposite first surface 108 of sol-gel 102. In at least one aspect, sol-gel 102 has a thickness that is less than the thickness of substrate 104. In at least one aspect, sol-gel 102 has a thickness of from about 1 µm (microns) to about 500 nm, such as from about 5 µm to about 100 nm, such as from about 10 µm to about 100 µm. Thinner coatings may have fewer defects (more likely to be defect free), while thicker coatings may provide more abrasion, electrical, and/or thermal protection to the underlying substrate 104.

In at least one aspect, secondary layer 106 includes organic material (e.g., organic chemical compositions) configured to bind and/or adhere to sol-gel 102. Secondary layer 106 includes a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. In at least one aspect, secondary layer 106 includes a polymer, a resin, a thermoset polymer, a thermoplastic polymer, an epoxy, a lacquer, a polyurethane, a polyester, or combinations thereof. Secondary layer 106 can additionally include a pigment, a binder, a surfactant, a diluent, a solvent, a particulate (e.g., mineral fillers), fibers (e.g., carbon, aramid, and/or glass fibers), or combinations thereof.

Methods of Making Sol-Gel

Methods of forming a sol-gel of the present disclosure include mixing a metal alkoxide, acetic acid, and water, followed by stirring for from about 1 minute to about 1 hour, such as about 30 minutes. An organosilane is then added to the mixture and stirred for from about 1 minute to about 1 hour, such as about 30 minutes. A corrosion inhibitor is added to the mixture. The mixture can be deposited onto a substrate, such as a metal substrate. The deposited mixture may be cured at ambient temperature or can be heated to increase the rate of curing/sol-gel formation.

Figure 2:
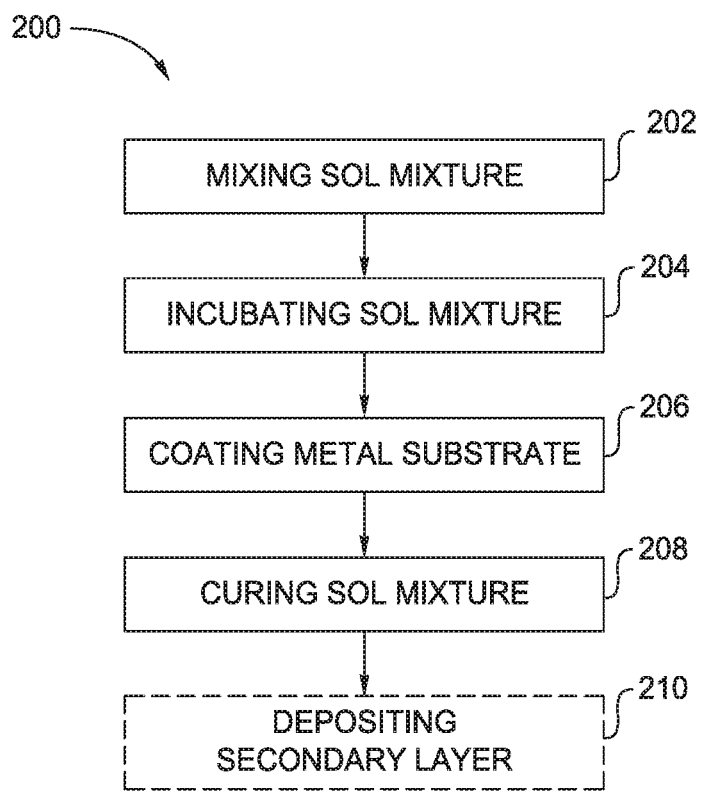
FIG. 2 is a flow chart of a method of forming a sol-gel.

FIG. 2 is a flow chart illustrating a method 200 of forming a sol-gel 102. At block 202, sol-gel 102 can be formed by mixing one or more sol-gel components. Sol-gel components include two or more of organosilane, metal alkoxide, acid, and corrosion inhibitor. Curing the mixed components forms sol-gel 102 (Block 208).

Generally, mixing is performed by combining the sol solution components (e.g., dissolving) and optionally stirring the sol solution components. Further, mixing generally includes mixing the sol solution components in amounts and/or ratios sufficient to provide an active sol solution that may react to form the sol-gel.

Mixing includes mixing the sol-gel components to form a mixture (e.g., a solution, an emulsion, a suspension, or a colloid). In at least one aspect, mixing includes mixing all sol-gel components together concurrently. Alternatively, mixing includes mixing any two components (e.g., metal alkoxide and acid) to form a first mixture and then mixing the remaining components into the first mixture to form a second mixture.

Mixing can include dissolving, suspending, emulsifying, and/or dispersing the corrosion inhibitor in a solvent before mixing with one or more of the other sol-gel components. Examples of solvents for dissolving, suspending, emulsifying, and/or dispersing sol-gel components include water, an alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures thereof. Additionally or alternatively, mixing can include mixing the corrosion inhibitor as a solid, an aggregate, and/or a powder with one or more of the other sol-gel components. Where, for example, mixing includes mixing solids, powders, and/or viscous liquids, mixing can include mixing with a high-shear mixer (e.g., a paint shaker or a planetary-centrifugal mixer or stirrer). A high-shear mixer may be advantageous to break and/or to finely disperse solids to form a substantially uniform mixture. For example, a high-shear mixer can dissolve, suspend, emulsify, disperse, homogenize, deagglomerate, and/or disintegrate solids into the sol solution.

Generally mixing includes mixing two or more sol-gel components to form a mixture. The sol-gel components can be dilute to control self-condensation reactions and thus increase the pot life of the mixed sol solution. Mixing can include mixing and a weight percent (wt %) of the corrosion inhibitor in the mixture that is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %. Mixing includes mixing and the weight fraction (wt %) of (metal alkoxide+hydroxy organosilane+acid) in the mixture is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %.

In at least one aspect, a molar ratio of acid to metal alkoxide is from about 1:1 to about 40:1, such as from about 3:1 to about 8:1, such as from about 4:1 to about 6:1, such as from about 4:1 to about 5:1. In at least one aspect, a ratio of corrosion inhibitor to binder is from about 1:1 to about 5:1 by weight, such as from about 2:1 to about 4:1 by weight, such as from about 2:1 to about 3:1 by weight. Alternatively, a ratio of corrosion inhibitor to binder is from about 0.01:1 to about 0.5:1 by weight, such as from about 0.05:1 to about 0.4:1 by weight, such as from about 0.1:1 to about 0.3:1 by weight, such as from about 0.01:1 to about 0.05:1 by weight.

At block 204, method 200 includes incubating the mixture of sol-gel components for a period of time, such as from about 1 minute to about 60 minutes, such as from about 5 minutes to about 30 minutes, such as from about 10 minutes to about 20 minutes. Furthermore, pot-life is the period of time from the mixing until the sol-gel is formed (e.g., the mixture becomes too viscous to be usable at ambient temperature). The pot life can be from about 1 hour to about 24 hours, such as from about 2 hours to about 8 hours, such as about 4 hours. Incubating may be performed under ambient conditions (e.g., at room temperature) and/or at elevated temperature. Suitable incubation temperatures include from about 10° C. to about 100° C., such as from about 20° C. to about 70° C., such as from about 30° C. to about 50° C., for example about 40° C.

In at least one aspect, at block 206, method 200 includes coating substrate 104 with a mixture comprising sol-gel components and incubating the mixture (Block 204). Incubating includes, after mixing the mixture comprising sol-gel components and allowing the mixture comprising sol-gel components to stand at room temperature for 30 minutes or more. At block 206, coating can include wetting the substrate 104 with a mixture comprising sol-gel components, for example, by spraying, immersing, brushing, and/or wiping the mixture comprising sol-gel components onto substrate 104. For example, suitable forms of spraying include spraying with a spray gun, high-volume, low-pressure spray gun, and/or hand pump sprayer. The mixture comprising sol-gel components is allowed to drain from the wetted substrate 104 for a few minutes (e.g., 1-30 minutes, 1-10 minutes, or 3-10 minutes) and, if necessary, excess, undrained mixture may be blotted off substrate 104 and/or gently blown off substrate 104 by compressed air.

In at least one aspect, at block 206, method 200 includes coating includes cleaning and/or pretreating substrate 104 before wetting the substrate with the mixture comprising sol-gel components. Generally, sol-gel 102 adheres and/or bonds better with a clean, bare substrate (e.g., metal substrate), substantially free from dirt, surface oxides, and/or corrosion products. Cleaning can include degreasing, an alkaline wash, chemical etching, chemically deoxidizing, and/or mechanically deoxidizing (e.g., sanding and/or abrading). Coating does not typically include coating substrate 104 with an undercoating or forming a chemical conversion coating on substrate 104. Instead, in most aspects, coating typically includes directly coating the (bare) substrate 104.

In at least one aspect, methods of the present disclosure include curing a mixture comprising sol-gel components. At block 208, curing can include drying a mixture comprising sol-gel components disposed on substrate 104 and may be performed under ambient conditions (e.g., at room temperature) and/or at elevated temperature. In at least one aspect, a curing temperature is from about 10° C. to about 150° C., such as from about 20° C. to about 100° C., such as from about 30° C. to about 70° C., such as from about 40° C. to about 50° C. Curing can be performed for a period of time, such as from about 1 minute to about 48 hours, such as from about 5 minutes to about 24 hours, such as from about 10 minutes to about 8 hours, such as from about 30 minutes to about 4 hours, for example about 1 hour.

After coating and/or curing, the sol-gel is suitable for exposure to an external environment and/or for application of a secondary layer 106. At block 210, method 200 includes depositing a secondary layer 106 of organic material can be performed before curing (Block 208) is completed, for example, depositing (at block 210) a secondary layer 106 can be performed at least partially concurrently with curing (at block 208). Depositing can include painting, spraying, immersing, contacting, adhering, and/or bonding sol-gel 102 with the organic material to form secondary layer 106. A secondary layer includes a paint, a fiber-reinforced plastic, or other suitable organic material.

Aspects

Clause 1. A sol-gel comprising:
an organosilane
a metal alkoxide;
an acid;
a chromium (III) salt and/or a lanthanide salt having a solubility of about 1 gram or greater per gram of sol-gel at 23° C.; and
water.

Clause 2. The sol-gel of Clause 1, wherein the chromium (III) salt and/or lanthanide salt comprises a ligand selected from a nitrate, a trifluoromethane sulfonate, a sulfate, a phosphate, a hydroxide, or hydrate forms thereof.

Clause 3. The sol-gel of Clauses 1 or 2, wherein the lanthanide salt comprises a cation selected from lanthanum, cerium, praseodymium, neodymium, promethium, samarium, europium, gadolinium, terbium, dysprosium, holmium, erbium, thulium, ytterbium, lutetium, scandium, yttrium, cobalt, calcium, strontium, barium, and zirconium.

Clause 4. The sol-gel of Clause 3, wherein the lanthanide salt comprises a cation selected from cerium, praseodymium, or yttrium.

Clause 5. The sol-gel of any of Clauses 1-4, wherein a weight fraction of the chromium (III) salt or lanthanide salt in the sol-gel is from about 0.2 wt % to about 50 wt %.

Clause 6. The sol-gel of any of Clauses 1-5, wherein a ratio of chromium (III) salt or lanthanide salt to the sum of metal alkoxide, organosilane, and acid is from about 0.01:1 to about 0.5:1 by weight.

Clause 7. The sol-gel of any of Clauses 1-6, wherein a ratio of chromium (III) salt or lanthanide salt to (metal alkoxide+organosilane+acid) is from about 1:1 to about 5:1 by weight.

Clause 8. The sol-gel of any of Clauses 1-7, wherein the sol-gel has a solids content of about 1 wt % or less, based on the total weight of the sol-gel.

Clause 9. The sol-gel of any of Clauses 1-8, wherein the sol-gel has a halogen content of about 1 wt % or less, based on the total weight of the sol-gel.

Clause 10. The sol-gel of any of Clauses 1-9, wherein the sol-gel comprises about 80 wt % or greater of water.

Clause 11. The sol-gel of any of Clauses 1-10, wherein the organosilane is represented by Formula (I):

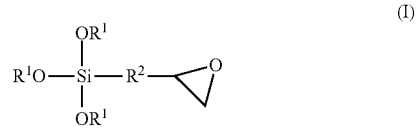

wherein:
each $R^1$ is independently selected from $C_1$-$C_{20}$ alkyl; and
$R^2$ is selected from alkyl, cycloalkyl, ether, and aryl.

Clause 12. The sol-gel of any of Clauses 1-10, wherein the organosilane is represented by Formula (II):

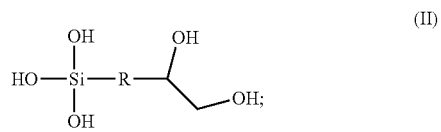

wherein R is selected from alkyl, cycloalkyl, ether, and aryl.

Clause 13. The sol-gel of Clause 12, wherein the organosilane is:

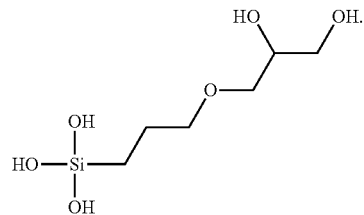 [SMILES: OCC(O)COCCC[Si](O)(O)O]

Clause 14. The sol-gel of any of Clauses 1-13, wherein the metal alkoxide is selected from the group comprising zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and mixtures thereof.

Clause 15. The sol-gel of any of Clauses 1-14, wherein the acid is acetic acid.

Clause 16. The sol-gel of any of Clauses 1-15, wherein a weight fraction of the sum of metal alkoxide, hydroxy organosilane, and acid in the sol-gel is at least 4 wt %.

Clause 17. The sol-gel of Clause 16, wherein the weight fraction is at least 15 wt %.

Clause 18. A component comprising:
a metal substrate; and
the sol-gel of any of Clauses 1-16 disposed on the metal substrate.

Clause 19. The component of Clause 18, further comprising a secondary layer disposed on the sol-gel.

Clause 20. The component of Clauses 18 or 19, wherein the secondary layer is an epoxy coating or urethane coating.
Clause 21. The component of any of Clauses 18-20, wherein the component is a vehicle component selected from an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and an internal component.
Clause 22. The component of any of Clauses 18-21, wherein the metal substrate is selected from aluminum, aluminum alloy, nickel, iron, iron alloy, steel, titanium, titanium alloy, copper, copper alloy, and mixtures thereof.
Clause 23. A method of forming a sol-gel, comprising:
  mixing a metal alkoxide and an acid to form a first mixture;
  mixing with the first mixture an organosilane to form a second mixture; and
  mixing a chromium (III) salt and/or a lanthanide salt with the second mixture to form a third mixture.
Clause 24. The method of Clause 23, further comprising depositing the first mixture, the second mixture, or the third mixture onto a metal substrate.
Clause 25. The method of Clauses 23 or 24, further comprising curing the third mixture.
Clause 26. The method of any of Clauses 23-25, further comprising cleaning the metal substrate by degreasing, alkaline washing, chemical etching, chemically deoxidizing, and/or mechanically deoxidizing the metal substrate prior to depositing.
Clause 27. The method of any of Clauses 23-26, further comprising depositing a secondary layer onto the sol-gel.
Clause 28. The method of any of Clauses 23-27, wherein the chromium (III) salt and the lanthanide salt each comprises a ligand selected from a nitrate, a trifluoromethane sulfonate, a sulfate, a phosphate, a hydroxide, or hydrate forms thereof.
Clause 29. The method of any of Clauses 23-28, wherein the lanthanide salt comprises a cation selected from lanthanum, cerium, praseodymium, neodymium, promethium, samarium, europium, gadolinium, terbium, dysprosium, holmium, erbium, thulium, ytterbium, lutetium, scandium, yttrium, cobalt, calcium, strontium, barium, and zirconium.
Clause 30. The method of Clause 29, wherein the lanthanide salt comprises a cation selected from lanthanum, cerium, praseodymium, or yttrium.

EXAMPLES

Experimental: Materials

Cerium (III) nitrate hexahydrate, chromium (III) sulfate hexahydrate, praseodymium (III) nitrate hexahydrate, and 2,5-dimercapto-1,3,4-thiadiazole were obtained from Sigma-Aldrich of St. Louis, Mo. 3% AC-131 kit was obtained from 3M. 3% AC-131 is a non-chromate conversion coating for use on aluminum, nickel, stainless steel, magnesium, and titanium alloys. AC-131 has a Part A, which is an aqueous mixture of acetic acid and zirconium tetra-n-propoxide (TPOZ), and a Part B, which is GTMS. The two components are mixed together (Part A+Part B) and the molar ratio of silicon to zirconium in the mixture is 2.77:1. A molar ratio of acetic acid to TPOZ in Part A is 0.45:1.

Glacial acetic acid (GAA) and Glycidoxypropyl-trimethoxy-silane (GTMS) were obtained from Sigma-Aldrich. Zirconium tetra-n-propoxide (TPOZ; 70% in n-propanol) was obtained from Sigma-Aldrich. Antarox BL-240 (pre-mixed, 10% wt in water) is a linear alcohol ethylene oxide (EO)/propylene-oxide (PO) wetting agent and was obtained from Solvay Chemicals. An epoxy, non-chromate primer was obtained from Hentzen Coatings, Inc.

Methods:

$Ce(NO_3)_3$ hexahydrate and $Pr(NO_3)_3$ hexahydrate salts were dissolved in a 15% sol-gel (according to Table 1). It was discovered that both salts are very soluble in the sol-gel. About 3 to 4 g of the salts fully dissolve in 1 g of the sol-gel by mixing the solution at room temperature with gentle agitation.

TABLE 1

| CRB | Lanthanide salt | GAA (mL) | TPOZ (mL) | Water (mL) | GTMS (mL) | BL-240 (mL) |
|---|---|---|---|---|---|---|
| 15% sol-gel (10 wt. % lanthanide salt) | $Ce(NO_3)_3$ hexahydrate 6 grams | 1.125 | 2.5 | 50 | 5 | 0.29 |
| 15% sol-gel (10 wt. % lanthanide salt) | $Pr(NO_3)_3$ hexahydrate 6 grams | 1.125 | 2.5 | 50 | 5 | 0.29 |

Cerium (III) nitrate, chromium (III) sulfate, and 2,5-Dimercapto-1,3,4-thiadiazole were investigated as corrosion inhibitors in a sol-gel coating. All three inhibitors are water soluble.

The sol gel was prepared from zirconium propoxide (TPOZ), acetic acid and (3-glycidyloxypropyl)trimethoxysilane (GTMS). Part "A" was prepared by adding glacial acetic acid (GAA) to TPOZ. 22.5 ml of GAA was added to 50 ml TPOZ. Care was taken to ensure all glass ware was completely dry at this point to avoid zirconium hydroxide formation. The resulting solutions were clear and light yellow in color. Then, 1000 ml of MQ water was added to the above solution, designated Part A. The solution, initially cloudy, was transferred to a 1 liter separatory funnel. After standing for 3 days, the solution became clear with a very thin layer of insoluble compound, probably zirconium hydroxide, accumulating at the top of the solution. 54 ml of the clear fraction was dispensed and mixed with 5.4 ml GTMS, and allowed to stand for 30 minutes prior to addition of the inhibitor.

The relative proportions of corrosion inhibitors for each formulation are shown in Table 2 along with their water solubilities.

TABLE 2

| Volume Part A Sol gel (ml) | Volume GTMS (ml) | Volume BL-240 Soln. (ml) | Inhibitor | Solubility in water | Wt. Inhibitor (gm) | % Inhibitor |
|---|---|---|---|---|---|---|
| 54 | 5.4 | 0.3 | Cerium (III) Nitrate Hexahydrate | 1754 g/L (25° C.) | 0.4 | 0.67 |
| 54 | 5.4 | 0.3 | Cerium (III) Nitrate Hexahydrate | 1754 g/L (25° C.) | 1.816 | 2.95 |
| 54 | 5.4 | 0.3 | Cr(III) Sulfate Hexahydrate | 640 g/L (25° C.) | 0.656 | 1.09 |
| 54 | 5.4 | 0.3 | 2,5-Dimercapto-1,3,4-thiadiazole | 26.4 g/L (25° C.) | 0.252 | 0.39 |

TABLE 2-continued

| Volume Part A Sol gel (ml) | Volume GTMS (ml) | Volume BL-240 Soln. (ml) | Inhibitor | Solubility in water | Wt. Inhibitor (gm) | % Inhibitor |
|---|---|---|---|---|---|---|
| 54 | 5.4 | 0.3 | 2,5-Dimercapto-1,3,4-thiadiazole | 26.4 g/L (25° C.) | 1.011 | 1.53 |

The formulations were mixed on the THINKY Planetary Centrifugal Vacuum Mixer (30 s 500 RPM, 30 s 1000 RPM, 60 s 1500 RPM).

2024-T3 and 7075-T6 aluminum alloy panels were abraded with scotch brite and coatings were brush applied. Panels were allowed to air dry, followed by drying in air for 24 hours at room temperature. In the case of the Cr (III) sulfate coating, the panel was dried at 70° C. for 72 hours. The panels were then exposed to neutral salt spray (ASTM B117) for durations noted.

Photographs for the cerium sol-gel coating were obtained. The higher concentration (2.95%) showed improved protection as compared to the 0.67% formulation. The chromium (III) sulfate coatings showed dramatically improved protection over the control (no inhibitor added to the sol gel). Furthermore, 2,5-dimercapto-1,3,4-thiadiazole (DMcT) exhibited significant corrosion protection at both high and low levels in the sol gel coating as compared to the control.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Definitions

As used herein, "composition", such as a sol-gel, includes a mixture of components and/or the reaction product(s) of the components. Similarly, a sol-gel can be considered a composition.

The term "optionally substituted" means that a group is either substituted or unsubstituted, at any available position. Substitution can be with one or more groups selected from, e.g., alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyoate, heteroaryloate, alkylcarbonylamino, cycloalkylcarbonylamino, arylcarbonylamino, heterocyclylcarbonylamino, heteroarylcarbonylamino, nitro, hydroxyl, halo, haloalkyl, haloaryl, haloheterocyclyl, haloheteroaryl, haloalkoxy, silylalkyl, alkenylsilylalkyl, alkynylsilylalkyl, and amino. The optional substitution may be one or more groups selected from halo, alkyl, formyl, and amino. The optional substituents may include salts of the groups, for example carboxylate salts. It will be appreciated that other groups not specifically described may also be used.

The term "fused" refers to one or more rings that share at least two common ring atoms with one or more other rings. A heteroaromatic group is an aromatic group or ring containing one or more heteroatoms, such as N, O, S, Se, Si or P. As used herein, "heteroaromatic" is used interchangeably with "heteroaryl", and a heteroaryl group refers to monovalent aromatic groups, bivalent aromatic groups and higher multivalency aromatic groups containing one or more heteroatoms.

"Alkyl" whether used alone, or in compound words such as alkoxy, alkylthio, alkylamino, dialkylamino or haloalkyl, represents straight or branched chain hydrocarbons ranging in size from one to about 10 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 10 carbon atoms, or greater.

"Alkenyl" whether used alone, or in compound words such as alkenyloxy or haloalkenyl, represents straight or branched chain hydrocarbons containing at least one carbon-carbon double bond, including, unless explicitly limited to smaller groups, moieties ranging in size from two to about 6 carbon atoms or greater, such as, methylene, ethylene, 1-propenyl, 2-propenyl, and/or butenyl, pentenyl, hexenyl, and higher isomers, including, e.g., those straight or branched chain hydrocarbons ranging in size, for example, from about 6 to about 10 carbon atoms, or greater.

"Alkynyl" whether used alone, or in compound words such as alkynyloxy, represents straight or branched chain hydrocarbons containing at least one carbon-carbon triple bond, including, unless explicitly limited to smaller groups, moieties ranging in size from, e.g., two to about 6 carbon atoms or greater, such as, ethynyl, 1-propynyl, 2-propynyl, and/or butynyl, pentynyl, hexynyl, and higher isomers, including, e.g., those straight or branched chain hydrocarbons ranging in size from, e.g., about 6 to about 10 carbon atoms, or greater.

"Cycloalkyl" represents a mono- or polycarbocyclic ring system of varying sizes, e.g., from about 3 to about 10 carbon atoms, e.g., cyclopropyl, cyclobutyl, cyclopentyl, cyclohexyl or cycloheptyl. The term cycloalkyloxy represents the same groups linked through an oxygen atom such as cyclopentyloxy and cyclohexyloxy. The term cycloalkylthio represents the same groups linked through a sulfur atom such as cyclopentylthio and cyclohexylthio.

"Cycloalkenyl" represents a non-aromatic mono- or polycarbocyclic ring system, e.g., of about 3 to about 10 carbon atoms containing at least one carbon-carbon double bond, e.g., cyclopentenyl, cyclohexenyl or cycloheptenyl. The term "cycloalkenyloxy" represents the same groups linked through an oxygen atom such as cyclopentenyloxy and cyclohexenyloxy. The term "cycloalkenylthio" represents the same groups linked through a sulfur atom such as cyclopentenylthio and cyclohexenylthio.

The terms, "carbocyclic" and "carbocyclyl" represent a ring system wherein the ring atoms are all carbon atoms, e.g., of about 3 to about 10 carbon atoms, and which may be aromatic, non-aromatic, saturated, or unsaturated, and may be substituted and/or carry fused rings. Examples of such groups include benzene, cyclopentyl, cyclohexyl, or fully or partially hydrogenated phenyl, naphthyl and fluorenyl.

"Aryl" whether used alone, or in compound words such as arylalkyl, aryloxy or arylthio, represents: (i) an optionally substituted mono- or polycyclic aromatic carbocyclic moiety, e.g., of about 6 to about 60 carbon atoms, such as phenyl, naphthyl or fluorenyl; or, (ii) an optionally substituted partially saturated polycyclic carbocyclic aromatic ring system wherein an aryl and a cycloalkyl or cycloalkenyl group are fused together to form a cyclic structure such as a tetrahydronaphthyl, indenyl indanyl or fluorene ring.

"Heterocyclyl" or "heterocyclic" whether used alone, or in compound words such as heterocyclyloxy represents: (i) an optionally substituted cycloalkyl or cycloalkenyl group, e.g., of about 3 to about 60 ring members, which may contain one or more heteroatoms such as nitrogen, oxygen, or sulfur (examples include pyrrolidinyl, morpholino, thiomorpholino, or fully or partially hydrogenated thienyl, furyl, pyrrolyl, thiazolyl, oxazolyl, oxazinyl, thiazinyl, pyridyl and azepinyl); (ii) an optionally substituted partially saturated polycyclic ring system in which an aryl (or heteroaryl) ring and a heterocyclic group are fused together to form a cyclic structure (examples include chromanyl, dihydrobenzofuryl and indolinyl); or (iii) an optionally substituted fully or partially saturated polycyclic fused ring system that has one or more bridges (examples include quinuclidinyl and dihydro-1,4-epoxynaphthyl).

"Heteroaryl" or "hetaryl" whether used alone, or in compound words such as heteroaryloxy represents: (i) an optionally substituted mono- or polycyclic aromatic organic moiety, e.g., of about 1 to about 10 ring members in which one or more of the ring members is/are element(s) other than carbon, for example nitrogen, oxygen, sulfur or silicon; the heteroatom(s) interrupting a carbocyclic ring structure and having a sufficient number of delocalized pi electrons to provide aromatic character, provided that the rings do not contain adjacent oxygen and/or sulfur atoms. Typical 6-membered heteroaryl groups are pyrazinyl, pyridazinyl, pyrazolyl, pyridyl and pyrimidinyl. All regioisomers are contemplated, e.g., 2-pyridyl, 3-pyridyl and 4-pyridyl. Typical 5-membered heteroaryl rings are furyl, imidazolyl, oxazolyl, isoxazolyl, isothiazolyl, oxadiazolyl, pyrrolyl, 1,3,4-thiadiazolyl, thiazolyl, thienyl, triazolyl, and silole. All regioisomers are contemplated, e.g., 2-thienyl and 3-thienyl. Bicyclic groups typically are benzo-fused ring systems derived from the heteroaryl groups named above, e.g., benzofuryl, benzimidazolyl, benzthiazolyl, indolyl, indolizinyl, isoquinolyl, quinazolinyl, quinolyl and benzothienyl; or, (ii) an optionally substituted partially saturated polycyclic heteroaryl ring system in which a heteroaryl and a cycloalkyl or cycloalkenyl group are fused together to form a cyclic structure such as a tetrahydroquinolyl or pyrindinyl ring.

"Formyl" represents a —CHO moiety.

"Alkanoyl" represents a —C(=O)-alkyl group. An alkanoyl group may range in size from about $C_2$-$C_{20}$. One example is acyl.

"Aroyl" represents a —C(=O)-aryl group. An aroyl group may range in size from about $C_7$-$C_{20}$. Examples include benzoyl and 1-naphthoyl and 2-naphthoyl.

"Heterocycloyl" represents a —C(=O)-heterocyclyl group. An heterocycloyl may range in size from about $C_4$-$C_{20}$. "Heteroaroyl" represents a —C(=O)-heteroaryl group. A heteroaroyl group may range in size from about $C_6$-$C_{20}$. An example is pyridylcarbonyl.

"Carboxyl" represents a —$CO_2$H moiety.

"Oxycarbonyl" represents a carboxylic acid ester group —$CO_2$R which is linked to the rest of the molecule through a carbon atom.

"Alkoxycarbonyl" represents an —$CO_2$-alkyl group. An alkoxycarbonyl group may range in size from about $C_2$-$C_{20}$. Examples include methoxycarbonyl and ethoxycarbonyl.

"Aryloxycarbonyl" represents an —$CO_2$-aryl group. Examples include phenoxycarbonyl and naphthoxycarbonyl.

"Heterocyclyloxycarbonyl" represents a —$CO_2$-heterocyclyl group.

"Heteroaryloxycarbonyl" represents a —$CO_2$-heteroaryl group.

"Aminocarbonyl" represents a carboxylic acid amide group —C(=O)NHR or —C(=O)$NR_2$ which is linked to the rest of the molecule through a carbon atom.

"Alkylaminocarbonyl" represents a —C(=O)NHR or —C(=O)$NR_2$ group in which R is an alkyl group.

"Arylaminocarbonyl" represents a —C(=O)NHR or —C(=O)$NR_2$ group in which R is an aryl group.

"Heterocyclylaminocarbonyl" represents a —C(=O)NHR or —C(=O)$NR_2$ group in which R is a heterocyclic group. $NR_2$ may for example be a heterocyclic ring, which is optionally substituted.

"Heteroarylaminocarbonyl" represents a —C(=O)NHR or —C(=O)$NR_2$ group in which R is a heteroaryl group. $NR_2$ may for example be a heteroaryl ring, which is optionally substituted.

"Cyano" represents a —CN moiety.

"Hydroxyl" represents a —OH moiety.

"Alkoxy" represents an —O-alkyl group. Examples include methoxy, ethoxy, n-propoxy, iso-propoxy, and the different butoxy, pentoxy, hexyloxy and higher isomers.

"Aryloxy" represents an —O-aryl group. Examples include, without limitation, phenoxy and naphthoxy. "Alkenyloxy" represents an —O-alkenyl group. An example is allyloxy.

"Heterocyclyloxy" represents an —O-heterocyclyl group.

"Heteroaryloxy" represents an —O-heteroaryl group. An example is pyridyloxy.

"Alkanoate" represents an —OC(=O)—R group in which R is an alkyl group.

"Aryloate" represents a —OC(=O)—R group in which R is an aryl group.

"Heterocyclyloate" represents an —OC(=O)—R group in which R is a heterocyclic group.

"Heteroaryloate" represents an —OC(=O)—R group in which P is a heteroaryl group.

"Amino" represents an —$NH_2$ moiety.

"Alkylamino" represents an —NHR or —$NR_2$ group in which R is an alkyl group. Examples include, without limitation, methylamino, ethylamino, n-propylamino, iso-propylamino, and the different butylamino, pentylamino, hexylamino and higher isomers.

"Arylamino" represents an —NHR or —$NR_2$ group in which R is an aryl group. An example is phenylamino.

"Heterocyclylamino" represents an —NHR or —$NR_2$ group in which R is a heterocyclic group. $NR_2$ may for example be a heterocyclic ring, which is optionally substituted.

"Heteroarylamino" represents a —NHR or —$NR_2$ group in which R is a heteroaryl group. $NR_2$ may for example be a heteroaryl ring, which is optionally substituted.

"Carbonylamino" represents a carboxylic acid amide group —NHC(=O)R that is linked to the rest of the molecule through a nitrogen atom.

"Alkylcarbonylamino" represents —NHC(=O)R group in which R is an alkyl group.

"Arylcarbonylamino" represents an —NHC(=O)R group in which R is an aryl group a.

"Heterocyclylcarbonylamino" represents an —NHC(=O)R group in which R is a heterocyclic group. "Heteroarylcarbonylamino" represents an —NHC(=O)R group in which R is a heteroaryl group.

"Nitro" represents a —NO₂ moiety.

"Aldehyde" represents a —C(=O)H group.

"Alkylsilyl" represents an alkyl group that is linked to the rest of the molecule through the silicon atom, which may be substituted with up to three independently selected alkyl groups.

"Alkenylsilyl" presents an alkenyl group that is linked to the rest of the molecule through the silicon atom, which may be substituted with up to three independently selected alkenyl groups.

"Alkynylsilyl" presents an alkynyl group that is linked to the rest of the molecule through the silicon atom, which may be substituted with up to three independently selected alkynyl groups.

The term "halo" or "halogen" whether alone or in compound words such as haloalkyl, haloalkoxy or haloalkylsulfonyl, represents fluorine, chlorine, bromine or iodine. Further, when used in compound words such as haloalkyl, haloalkoxy or haloalkylsulfonyl, the alkyl may be partially halogenated or fully substituted with halogen atoms which may be independently the same or different.

Examples of haloalkyl include, without limitation, —CH₂CH₂F, —CF₂CF₃ and —CH₂CHFCl. Examples of haloalkoxy include, without limitation, —OCHF₂, —OCF₃, —OCH₂CCl₃, —OCH₂CF₃ and —OCH₂CH₂CF₃. Examples of haloalkylsulfonyl include, without limitation, —SO₂CF₃, —SO₂CCl₃, —SO₂CH₂CF₃ and —SO₂CF₂CF₃.

The terms "thiol", "thio", "mercapto" or "mercaptan" refer to an organosulphur group containing a sulphurhydryl moiety —SH, which includes a R—SH group where R is a moiety containing a carbon atom for coordination to the —SH moiety, for example an alkylsulphur group. For example, the thiol or mercapto group may be a sulphurhydryl moiety —SH.

The compounds described herein may include salts, solvates, hydrates, isomers, tautomers, racemates, stereoisomers, enantiomers or diastereoisomers of those compounds. For example salts may include sodium, potassium, calcium, nitrates, phosphates, sulphates, and chlorides. In one embodiment the compounds include salts thereof selected from sodium salts.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

While we have described preferred aspects, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate aspects of the present disclosure and are not intended to limit the scope of the present disclosure.

What is claimed is:

1. A sol-gel comprising:
an organosilane
a metal alkoxide;
an acid;
a chromium (III) salt comprising a ligand selected from a nitrate, a trifluoromethane sulfonate, a sulfate, a phosphate, a hydroxide, or hydrate forms thereof; and
water.

2. The sol-gel of claim 1, wherein a weight fraction of the chromium (III) salt in the sol-gel is about 0.2 wt % to about 50 wt %.

3. The sol-gel of claim 1, wherein a ratio of chromium (III) salt to the sum of metal alkoxide, organosilane, and acid is about 0.01:1 to about 0.5:1 by weight.

4. The sol-gel of claim 1, wherein a ratio of chromium (III) salt to (metal alkoxide+organosilane+acid) is about 1:1 to about 5:1 by weight.

5. The sol-gel of claim 1, wherein the sol-gel has a solids content of about 1 wt % or less, based on the total weight of the sol-gel.

6. The sol-gel of claim 5, wherein the sol-gel has a halogen content of about 1 wt % or less, based on the total weight of the sol-gel.

7. The sol-gel of claim 6, wherein the sol-gel comprises about 80 wt % or greater of water.

8. The sol-gel of claim 6, wherein the organosilane is represented by Formula (I):

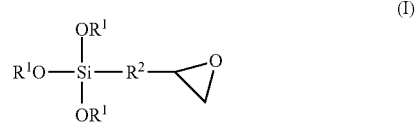

wherein:
each R¹ is independently selected from C₁-C₂₀ alkyl; and
R² is selected from alkyl, cycloalkyl, ether, and aryl.

9. The sol-gel of claim 6, wherein the organosilane is represented by Formula (II):

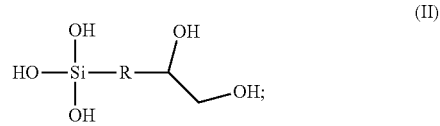

wherein R is selected from alkyl, cycloalkyl, ether, and aryl.

10. The sol-gel of claim 9, wherein the organosilane is:

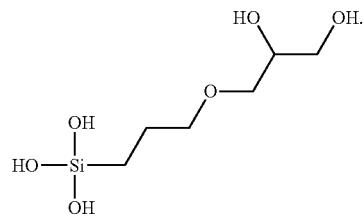 [SMILES: OCC(O)COCCC[Si](O)(O)O]

11. The sol-gel of claim 1, wherein the metal alkoxide is selected from zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV)

tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, or mixtures thereof.

12. The sol-gel of claim 1, wherein the acid is acetic acid.

13. The sol-gel of claim 1, wherein a weight fraction of the sum of metal alkoxide, organosilane, and acid in the sol-gel is at least 4 wt %.

14. The sol-gel of claim 13, wherein the weight fraction is at least 15 wt %.

15. The sol-gel of claim 1, wherein the chromium (III) salt comprises a sulfate ligand or hydrate form thereof.

16. The sol-gel of claim 15, wherein the chromium (III) salt is chromium (III) sulfate hexahydrate.

17. The sol-gel of claim 1, wherein the chromium (III) salt comprises a nitrate ligand or hydrate form thereof.

18. The sol-gel of claim 1, wherein the chromium (III) salt comprises a trifluoromethane sulfonate ligand or hydrate form thereof.

19. The sol-gel of claim 1, wherein the chromium (III) salt comprises a phosphate ligand or hydrate form thereof.

20. The sol-gel of claim 1, wherein the chromium (III) salt comprises a hydroxide ligand or hydrate form thereof.

21. A component comprising:
a metal substrate; and
the sol-gel of claim 1 disposed on the metal substrate.

22. The component of claim 21, further comprising a secondary layer disposed on the sol-gel.

23. The component of claim 22, wherein the secondary layer is an epoxy coating or urethane coating.

24. The component of claim 21, wherein the component is a vehicle component selected from an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, or an internal component.

25. The component of claim 21, wherein the metal substrate comprises a metal selected from aluminum, aluminum alloy, nickel, iron, iron alloy, steel, titanium, titanium alloy, copper, copper alloy, or mixtures thereof.

26. A method of forming a sol-gel, comprising:
mixing a metal alkoxide and an acid to form a first mixture;
mixing with the first mixture an organosilane to form a second mixture; and
mixing a chromium (III) salt with the second mixture to form a third mixture, wherein the chromium (III) salt comprises a ligand selected from a nitrate, a trifluoromethane sulfonate, a sulfate, a phosphate, a hydroxide, or hydrate forms thereof.

27. The method of claim 26, further comprising depositing the third mixture onto a metal substrate.

28. The method of claim 27, further comprising curing the third mixture.

29. The method of claim 27, further comprising cleaning the metal substrate by degreasing, alkaline washing, chemical etching, chemically deoxidizing, and/or mechanically deoxidizing the metal substrate prior to depositing.

30. The method of claim 27, further comprising depositing a secondary layer onto the sol-gel.

31. The method of claim 26, wherein the chromium (III) salt comprises a sulfate ligand or hydrate form thereof.

32. The method of claim 31, wherein the chromium (III) salt is a chromium (III) sulfate hexahydrate.

33. The method of claim 26, wherein the chromium (III) salt comprises a nitrate ligand or hydrate form thereof.

34. The method of claim 26, wherein the chromium (III) salt comprises a trifluoromethane sulfonate ligand or hydrate form thereof.

35. The method of claim 26, wherein the chromium (III) salt comprises a phosphate ligand or hydrate form thereof.

36. The method of claim 26, wherein the chromium (III) salt comprises a hydroxide ligand or hydrate form thereof.

* * * * *